United States Patent

Arvay et al.

[15] 3,678,379

[45] July 18, 1972

[54] COMPUTER CONTROLLED MULTICONDUCTOR COMMUNICATION CABLE TESTING SYSTEM

[72] Inventors: Frank Joseph Arvay, Scotch Plains; George Frieber, Basking Ridge; Joseph William Lechleider, Colts Neck; Robert Anderson Sutton, Whitehouse, all of N.J.

[73] Assignee: Bell Telephone Laboratories Incorporated, Murray Hill, N.J.

[22] Filed: Dec. 4, 1970

[21] Appl. No.: 95,029

[52] U.S. Cl.......................................324/73, 324/51, 324/57

[51] Int. Cl.......................................G01r 27/00, G01r 15/12

[58] Field of Search..........................324/57 R, 57 NB, 73, 51

[56] References Cited

UNITED STATES PATENTS

| | | | |
|---|---|---|---|
| 3,584,295 | 6/1971 | Bayer et al. | 324/57 R |
| 3,243,699 | 3/1966 | Kummer | 324/57 R |
| 3,237,100 | 2/1966 | Chalfin et al. | 324/73 R |
| 3,182,253 | 5/1965 | Dorsch et al. | 324/66 X |
| 3,526,834 | 9/1970 | Brown | 324/57 |
| 3,355,662 | 11/1967 | Haynie et al. | 324/57 R |
| 2,578,348 | 12/1951 | Gannett | 324/57 NB |

*Primary Examiner*—Gerard R. Strecker
*Attorney*—R. J. Guenther and Edwin B. Cave

[57] ABSTRACT

Automatic sequential testing of the transmission characteristics of the conductors in a multipair communication cable is effected by the use of computer techniques to provide programming and initiation of switching sequences. A standard loss comparison technique is implemented by fast acting connector mechanisms and high isolation switch matrices.

5 Claims, 13 Drawing Figures

PATENTED JUL 18 1972 3,678,379

INVENTORS F. J. ARVAY
G. FRIEBER
J. W. LECHLEIDER
R. A. SUTTON

E J Olmider

ATTORNEY

COMPUTER CONTROLLED MULTICONDUCTOR COMMUNICATION CABLE TESTING SYSTEM

BACKGROUND OF THE INVENTION

1. Field of the Invention

This invention relates to systems for testing various transmission characteristics of the conductors in a multipair communication cable and particularly to automatic systems for effecting such testing.

2. Description of the Prior Art

The recent substantial increase in the production of multipair cable for wideband transmission systems has pointed up the need for a radical improvement in present testing methods and apparatus. Known methods of measuring transmission properties are limited in both speed and flexibility owing largely to the multiplicity of manual operations involved which in turn contributes to results lacking in reliability. Some degree of automation has been employed in the past with respect to limited tests such as insulation tests, for example, but repetitive hand operations are still required wherever a full range of cable characteristic tests are desired.

Accordingly, the general object of the invention is to enhance the speed, flexibility and accuracy of testing the transmission characteristics of multipair cables.

SUMMARY OF THE INVENTION

The stated object and related objects are achieved in accordance with the principles of the invention by a cable testing system that utilizes the programming and control capabilities of a computer to establish a wide variety of switching sequences to interconnect diverse testing and recording units so that a full range of tests may be accomplished automatically. Within the testing structure, copper coaxial tubing is used throughout to ensure R.F. isolation and, additionally, the switching functions are carried out by matrices of crosspoint switches that are themselves uniquely shielded by copper tubing.

Among the measurements performed by equipment embodying the principles of the invention are both near-end and far-end crosstalk loss and phase, insertion loss and phase and longitudinal mode crosstalk loss and phase.

In accordance with one aspect of the invention, a computer interface is employed to convert the coded logic levels of a control computer into voltage levels sufficiently powerful to energize appropriate individual units in the system. Additionally, the interface translates information from an analog-to-digital converter into the proper format for assimilation by the computer.

One important feature of the invention calls for connecting the cable under test to the test equipment by means of removable connector units. This feature allows setting up a second test cable, including actual connection and fanout of individual leads, while the system is in operation testing a first test cable. Individually spaced contact modules in the connector units give further assurance of a high degree of R.F. isolation throughout the test equipment.

DETAILED DESCRIPTION

Figure 1:
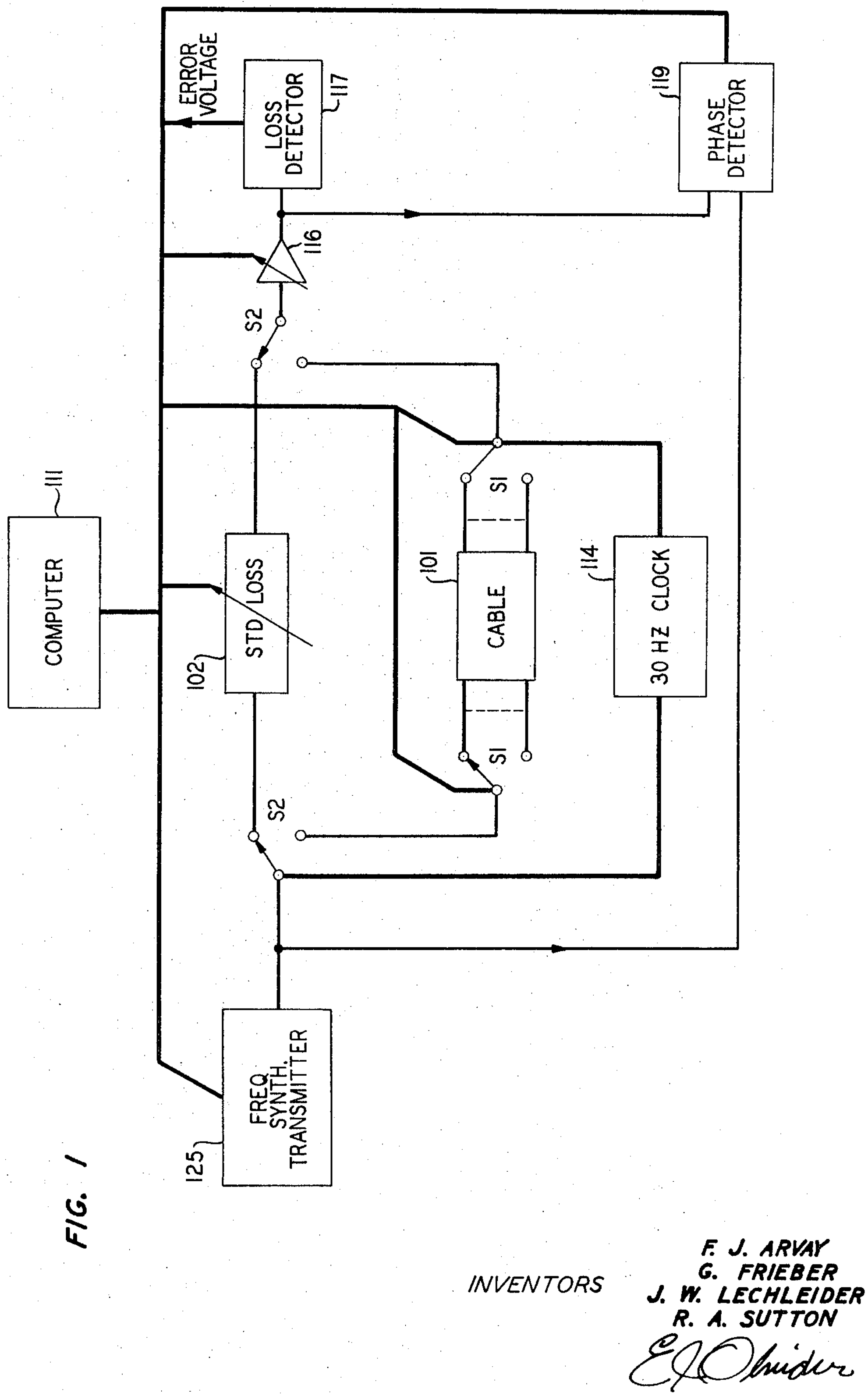
FIG. 1 is a simplified schematic block diagram of a test system in accordance with the invention.

As a preface to a description of the specific electrical and mechanical features of the embodiment of the invention illustrated in the drawing, certain general capabilities and principles of operation should be stated. In the system illustrated, the test signals cover a frequency range of 100 KHz to 10 MHz, provide a dynamic range of 150 db and ensure a phase shift measurement range of 360°. For losses less than 100 db, loss measurement precision is within 0.01 to 0.1 db and phase measurement precision is within 0.02° to 0.1°. For losses greater than 100 db, the indicated precision ranges are modified, respectively, to 0.1 to 2 db and 0.1° to 5.0°. The system is designed for a 100-pair capacity at both the near and far ends. Pair selection is made by switching matrices which are computer controlled. Specifically, the required switching sequence is controlled by suitable computer software, and the output is produced in the form of punched paper tape or, alternatively, by conventional typed page outputs. A system in accordance with the invention is capable of making the following measurements:

- near-end crosstalk loss and phase,
- far-end crosstalk loss and phase,
- insertion loss and phase,
- common mode suppression (longitudinal-metallic coupling), As shown in the simplified block diagram of FIG. 1, a cable 101 to be measured has one or more of its conductors connected in the test path by way of a composite switch S1 which is controlled by a computer 111. Control paths in FIG. 1 are indicated by heavy lines, while transmission paths are indicated by relatively light lines. A standard loss pad 102 and conductors of the cable 101 to be measured are alternately switched into the transmission path by a 30 Hz clock 114 that controls the switch S2. An error is formed by the measured difference in each particular characteristic between the inserted standard 102 and the inserted conductors of the cable 101. The computer 111 then readjusts the standard loss 102 and amplifier 116 by the amount of error indicated. In this sense, the computer 111 acts as a feedback path. The process is continued until maximum balance is obtained, and the final setting of the standard loss 102 is the loss of the unknown which is detected by the loss detector 117.

After the standard loss has been balanced, the phase shift of the unknown is measured by comparing the phase shift of the standard loss 102 with the phase shift occurring in the cable 101. The phase detector 119 measures phase by referencing the zero-crossing time of the received signal to the zero-crossing time of the transmitted signal. It is advantageous to employ an I.F. signal of 27.777 KHz since the period is exactly 36 micro-seconds and thus the time interval between zero-crossings can be converted directly into degrees of phase.

A suitable computer program, discussed in greater detail hereinbelow, is employed to control the particular frequencies generated by the transmitter 109. After all desired frequency measurements are made for a given test, the computer 111 selects another unknown to be measured via the switch S1. The standard loss 102 and amplifier 116 are arranged so that the loss of the standard 102 is equal to the gain of the amplifier 116. Accordingly, the input level to the detector 117 is the same as the transmitter level, and both phase and loss detection can be easily and accurately accomplished.

Figure 2:
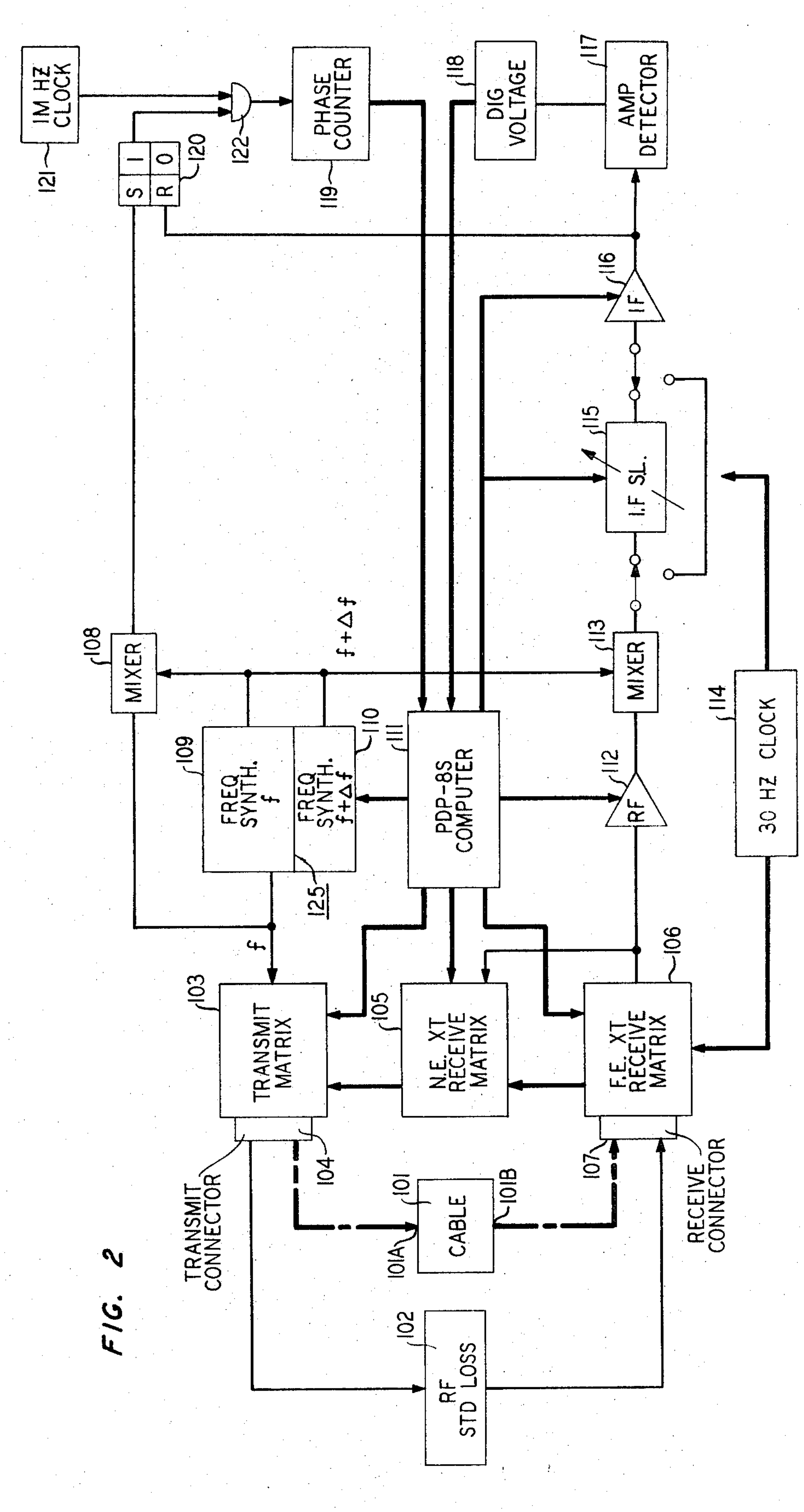
FIG. 2 is a substantially complete block diagram of a test system in accordance with the invention.

As indicated in the more detailed functional block diagram of FIG. 2, specific implementation of the general concepts illustrated in FIG. 1 is facilitated by introducing a constant frequency I.F. stage 116 preceded by an I.F. standard loss input 115 where fine adjustments can be made at the I.F. frequency in 0.01 db steps throughout the 0–70 db range. In this way, fine adjustment accuracy may be realized with no significant effect on threshold noise limitations. Bulk standard loss and amplifier adjustment (0–40–80 db) are made at the variable R.F. frequency in the R.F. amplifier 112.

As shown in FIG. 2, the function of switch S1 of FIG. 1 is performed by three switching matrices 103, 105 and 106, each employing a combination of ten by ten reed switches (not shown). The transmit matrix 103 provides one hundred possible switched paths from the transmitter 125 to the near-end 101A of the cable 101. Barrage crosstalk measurements are made possible since more than one crosspoint can be energized simultaneously. The near-end or NEXT crosstalk receive matrix 105 provides one hundred possible switched paths from the near-end 101A of the cable 101 to the receiver R.F. amplifier 112. The FEXT or far-end crosstalk receive matrix 106 provides a hundred possible switched paths from the far-end 101B of the cable 101 to the receiver side of the equipment. All matrix crosspoints are arranged to terminate the idle pairs automatically. Two connectors (not shown) of the transmit matrix 103 and the FEXT matrix 106 are employed to minimize connection time and cable-fanout crosstalk.

The desired element of the R.F. standard loss pad 102 is selected via crosspoints in the transmit matrix 103 and FEXT matrix 106. These particular crosspoints are gated by the 30 Hz clock 114. Transmitter signal leakage through nonoperated crosspoints is thus common to both standard loss and to unknown measurements. As a result, the feedback error is unaffected by such leakage over the 150 db dynamic range of the set. The transmitter 125 includes two programmable frequency synthesizers 109 and 110. One synthesizer 109 is used to provide the selected R.F. signal and the other, 110, gives the R.F. signal offset by a 27.777 KHz I.F. signal. The mixers 108 and 113 heterodyne these two frequencies to convert R.F. to I.F.

Amplitude detection of the signals transmitted through the loss pad 102 and the cable 101 is accomplished by an envelope detector 117 that converts the I.F. signal applied from the mixer 113 by way of the I.F. standard loss pad 115 and the I.F. amplifier 116. This conversion produces a proportional 30 Hz a.c. voltage which is full-wave rectified to provide the desired d.c. error voltage. It is this error voltage that is interfaced to the computer by the analog-to-digital converter 118.

Phase detection is accomplished by employing a flip-flop 120 to gate pulses from a 100 MHz clock 121 through an AND gate 122. The pulses are gated in the time interval between zero-crossing of the transmitter reference signal and the zero-crossing of the I.F. amplifier output signal. The pulse count in the phase counter 119 is then proportional to the transmitted and received phase difference and can be fed directly into the computer 111.

Figure 3:
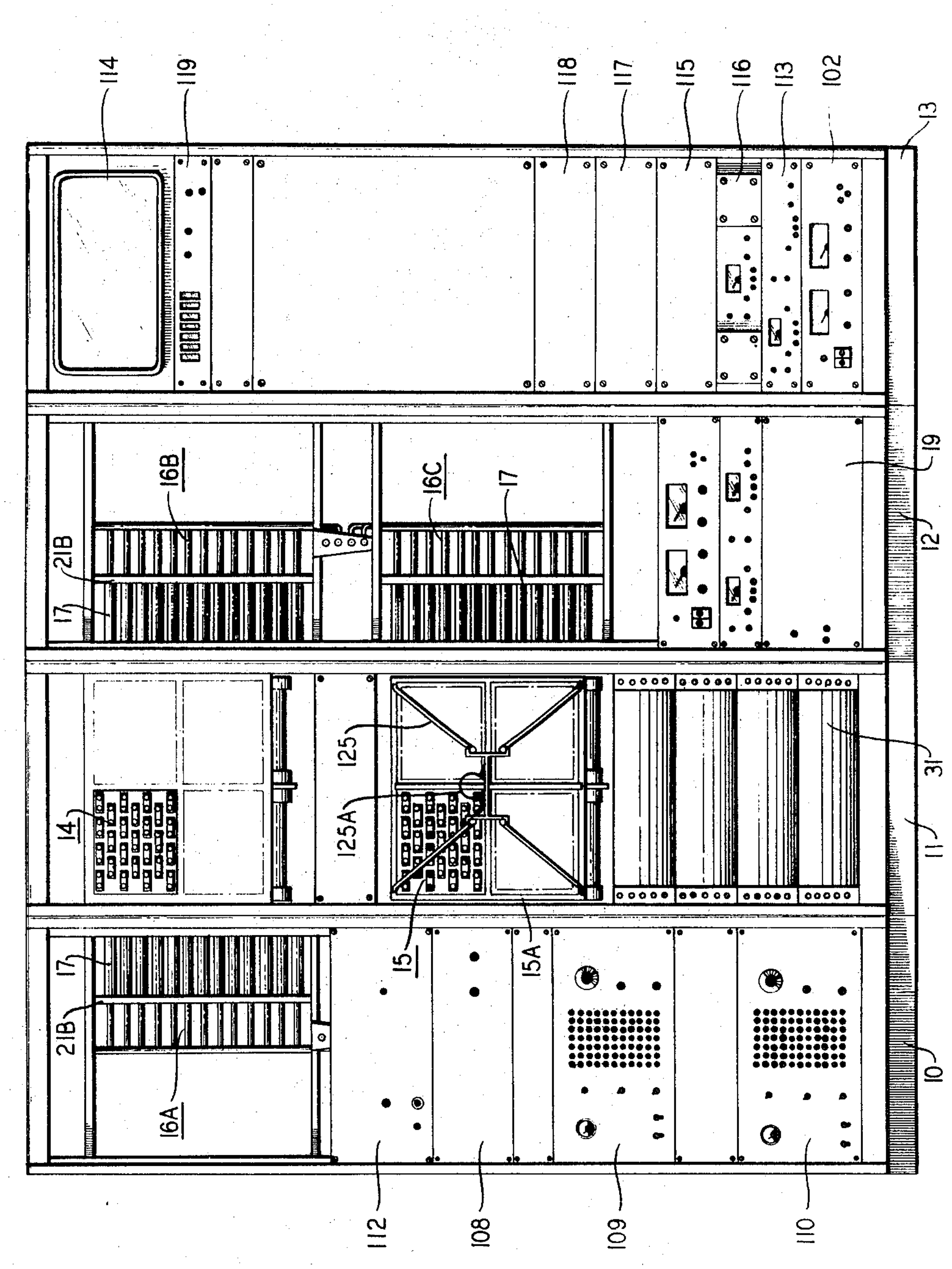
FIG. 3 is a front view sketch of the equipment assembly of the test system illustrated in FIG. 2.

A specific structural embodiment of the invention illustrated generally and functionally by FIGS. 1 and 2 is shown in FIGS. 3 through 6. As shown in FIG. 3, the entire system, exclusive of the computer 111 of FIGS. 1 and 2, may be conveniently mounted in a unified enclosure consisting of four single bay vertical cabinets 10–13. The modular construction provides the rigidity necessary for containing the mass of copper tubing and switching matrices which compose a large part of the system. The main sections are the connector mechanisms 14 and 15, the tee 60, arc 61 and fork coaxial copper tube assemblies 16*a*, *b* and *c*, the high isolation switch matrices 17 and the interface 31, and I.F. and R.F. equipment 19. Viewed from the front of the enclosure, as shown in FIG. 3, the near-end 14 and far-end 15 connector mechanisms are mounted one above the other in the front end of bay 11. Into the rear of the upper or near-end connector module 14 is plugged an array of 200 coaxial tees 60, best illustrated in FIG. 6, carrying the signal paths to and from the isolation switches 17. Providing a path for each wire instead of paired signal paths gives flexibility, provides additional shielding and allows common mode measurement.

Figure 4:
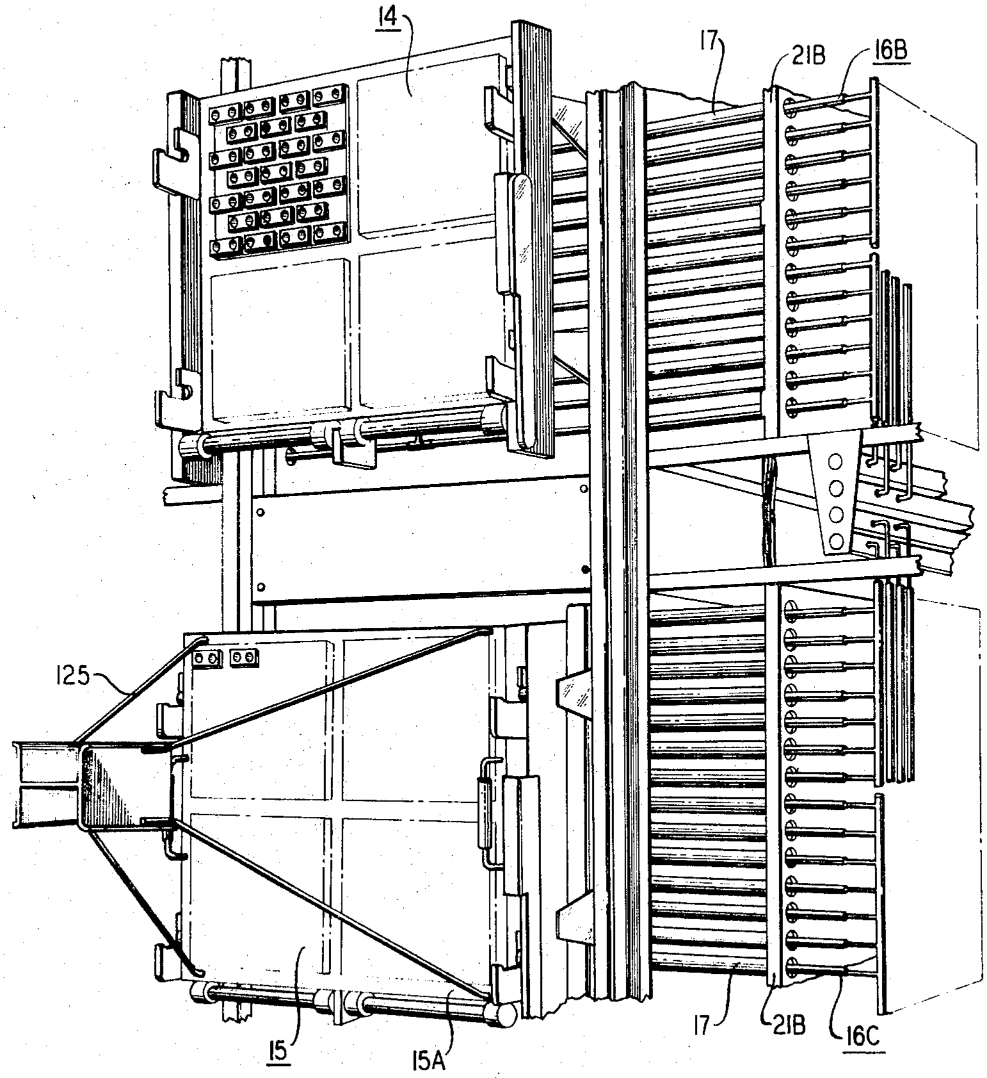
FIG. 4 is a front view sketch, shown in perspective, of a portion of the equipment assembly shown in FIG. 3.
Figure 5:
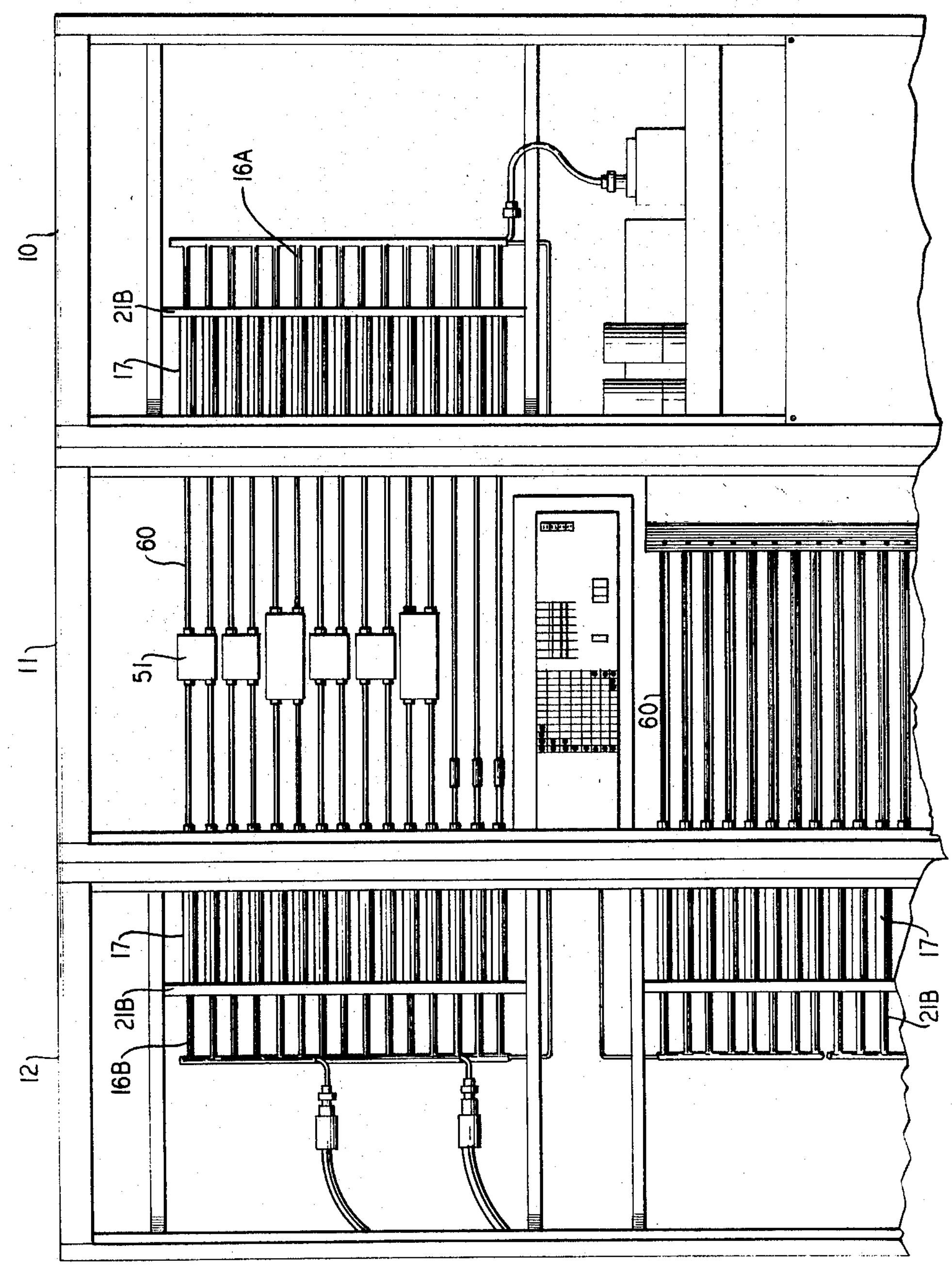
FIG. 5 is a rear view sketch of a portion of the equipment assembly shown in FIG. 4.
Figure 6:
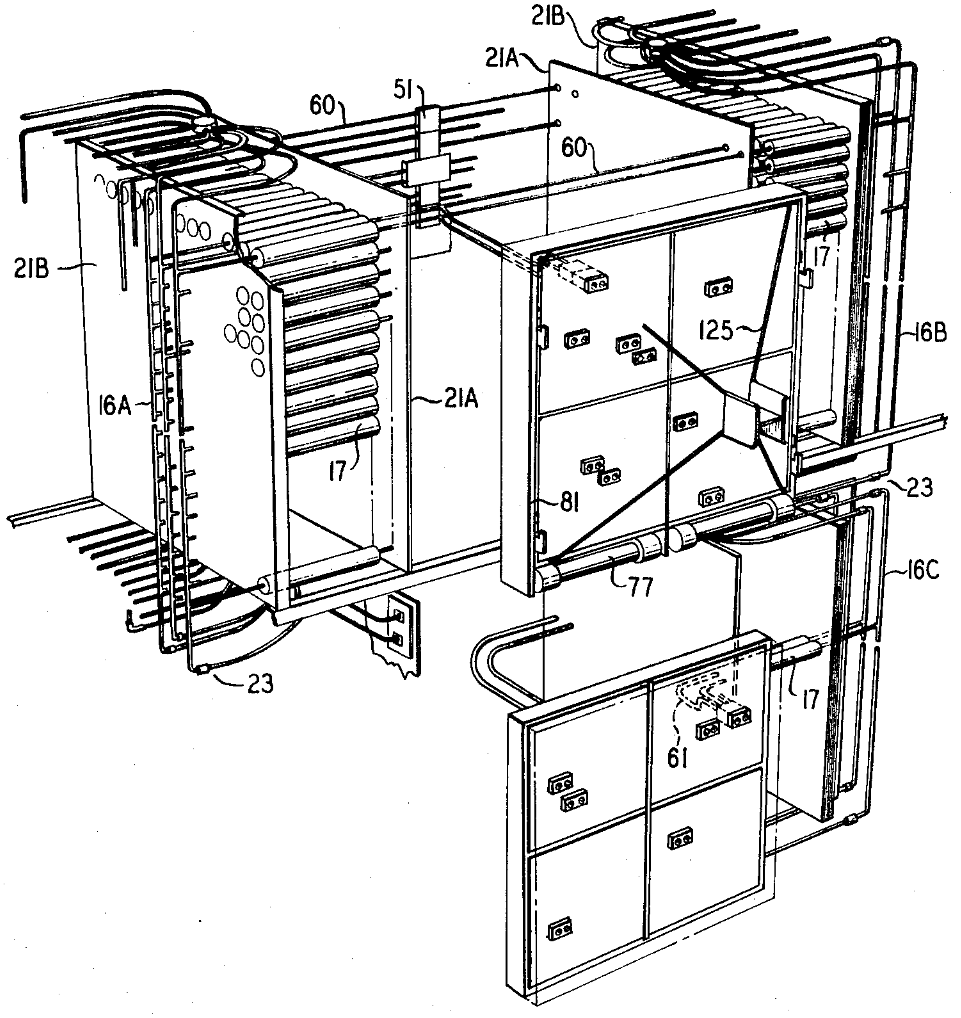
FIG. 6 is a front corner perspective sketch of the equipment shown in FIG. 3.

As illustrated in FIGS. 3, 4, 5 and 6, the left and right run of each tee 60 enters bay 10 and bay 12, respectively, and each corresponding coaxial jack (not shown) is supported by an aluminum support panel 21B. The cartridge type isolation switches 17 are plugged into these coaxial jacks. Vertical banks of fifteen switches each are terminated in coaxial copper forks 16 which connect to alternate fork headers 23 below, as shown in FIG. 6. That group of switches 17 located in bay 10 comprises the transmit matrix 103 of FIG. 2 which in its entirety includes the alternate fork headers 23 and the forks 16A as well as the isolation switches 17.

As discussed above, the transmit matrix 103 receives the signal from the R.F. frequency synthesizers 109 shown in bay 10 in FIG. 3. The similar group of switches 17 located in bay 12 forms a part of the near-end or NEXT crosstalk matrix, 105 of FIG. 2, which also includes its complement of forks 16B and headers 23. These elements bring the appropriate switched signal to the receiving section which is located in bay 13. Into the rear of the far-end or lower connector 15 is inserted an array of 200 coaxial arcs 61, shown partially in FIGS. 5 and 6 carrying the signal paths to the far-end isolation switches 17 located in the lower section of bay 12. The overall arrangement of switches, forks and headers in the far-end crosstalk matrix, 106 in FIG. 2, is similar to that described above in connection with the discussion of the transmit and receive matrices.

The "plumbing" or network of copper tube shielding associated with the R.F. standard loss selection is located in the rear section of bays 10, 11 and 12 behind the array of tees, arcs and isolation switches, as shown in FIGS. 5 and 6. This "-plumbing" is shown interconnecting isolation switches 17 in the transmit, near and far-end sections with the standard 0, 40 and 80 db series and shunt standard loss pads 51. The entire complex of transmit, near-end and far-end crosstalk matrices is advantageously designed for assembly on a coaxial plug-in basis to simplify replacement of defective or worn out items such as isolation switches.

A particularly critical part of the system insofar as specific mechanical design is concerned is the high isolation switch groups 17 which are shown in FIGS. 3 through 6. These switches are required to provide quick and positive contact between a generator and a detector for one or more pairs of a cable, while at the same time terminating other pairs not being measured. During a typical test series of a single cable, more than 500,000 switch operations may be required. In addition, in each switching operation, the applied R.F. signal must be efficiently shielded from adjacent signal paths. A matrix of 200 of these low profile, cartridge type switch units is used at the transmit end, the near-end and the far-end, making a total of 600 switches to serve a 100-pair cable. Basically, the switch is a T-configuration of four normally open contact reeds enclosed in a copper tube which provides shielding and a low resistance ground. A suitable switch of this type is shown in the U. S. Pat. application of of F. J. Arvay and R. A. Sutton, Ser. No. 878,521, filed Nov. 20, 1969. Coaxial plugs are employed at the output and input end of each switch for plugging into the R.F. section. A suitable receptacle (not shown) brings d.c. power to the energizing coils of each switch.

As explained above, signals from the computer 111, shown in FIGS. 1 and 2, are conveyed to the test equipment by way of an interface unit 31 which is rack-mounted at the bottom of bay 11 with wiring terminals being accessible at the front for ease of wiring modifications. Such interface units are well known in the art, and one type found to be suitable is manufactured by the Digital Equipment Corporation of Maynard, Massachusetts. The interface unit 31 converts the coded logic levels of the computer 111 into voltage levels sufficiently powerful to energize components of the test equipment. Additionally, it translates information from the analog-digital converter 118 into the proper format for assimilation by the computer 111.

Another critical part of the system is the apparatus, primarily the connector units 14 and 15, employed to complete connections between the cable tested and the test equipment. The features of this apparatus are designed to enable the achievement of a system crosstalk measurement capability of 150 db. A key aspect in the design of this apparatus involves extensive shielding and isolation between adjacent cable pairs on each connector panel. Features of a connector mechanism in accordance with the invention are illustrated in FIGS. 8, 9, 10A, 10B, 11A and 11B. A complete connector includes an aluminum framework 81, shown in FIG. 8, a front bay or removable portion 82, a rear bay or fixed portion 83 shown in FIG. 9 and a closure device 75 also shown in FIG. 9. Details of the closure device 75 appear in FIGS. 10A and 10B. The removable feature of the front bay 82 allows setting up a second test cable away from the connector unit while the system is in operation. The front and rear bays 82 and 83 each have space for an arrangement of four panels or sections best shown in FIG. 8 which contain the contact assemblies 121 illustrated in FIGS. 11A and 11B. Engagement of the front and rear contacts 122 and 123 is by action of a lever 76 which drives a roll cam 77, best shown in FIGS. 10A and 10B, which in turn positions the entire front bay 82. Engagement of the front bay 82 with the receiver mechanism of the back bay 83 does not take place until the front bay 82 is properly aligned and inserted. The camming action of the closure device 75 assures positive spring contact. Locking, contact wiping camming action and the engagement of the front bay with the receiver are all performed in a single operation.

Figure 11A:
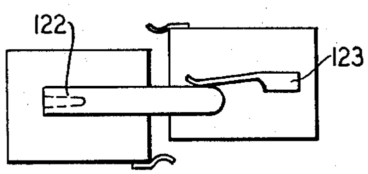
FIG. 11A is a side view sketch of a pair of connector contacts in a partially closed position.
Figure 11B:
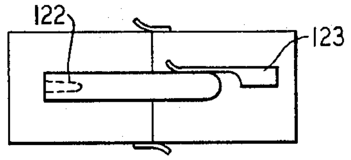
FIG. 11B is a sketch of the contacts of FIG. 11A shown in the closed position.

As illustrated in FIGS. 11A and 11B, each contact module houses a pair of pin-type contacts 122 which engage two corresponding paddle contacts 123 on one of the rear end modules 83. Each of the pin contacts 122 on the front bay 82 has a tapered opening at the rear to receive taper pins crimped to the paired leads coming to the test cable fanout (not shown). The paddle contacts 123 on the rear bay 83 have a large radius of curvature on the contact surface to prevent fouling upon engagement with the front bay pins 122 in case of misalignment between front and rear bays. The paddle contacts are similarly equipped at the rear to accept a taper pin.

Figure 8:
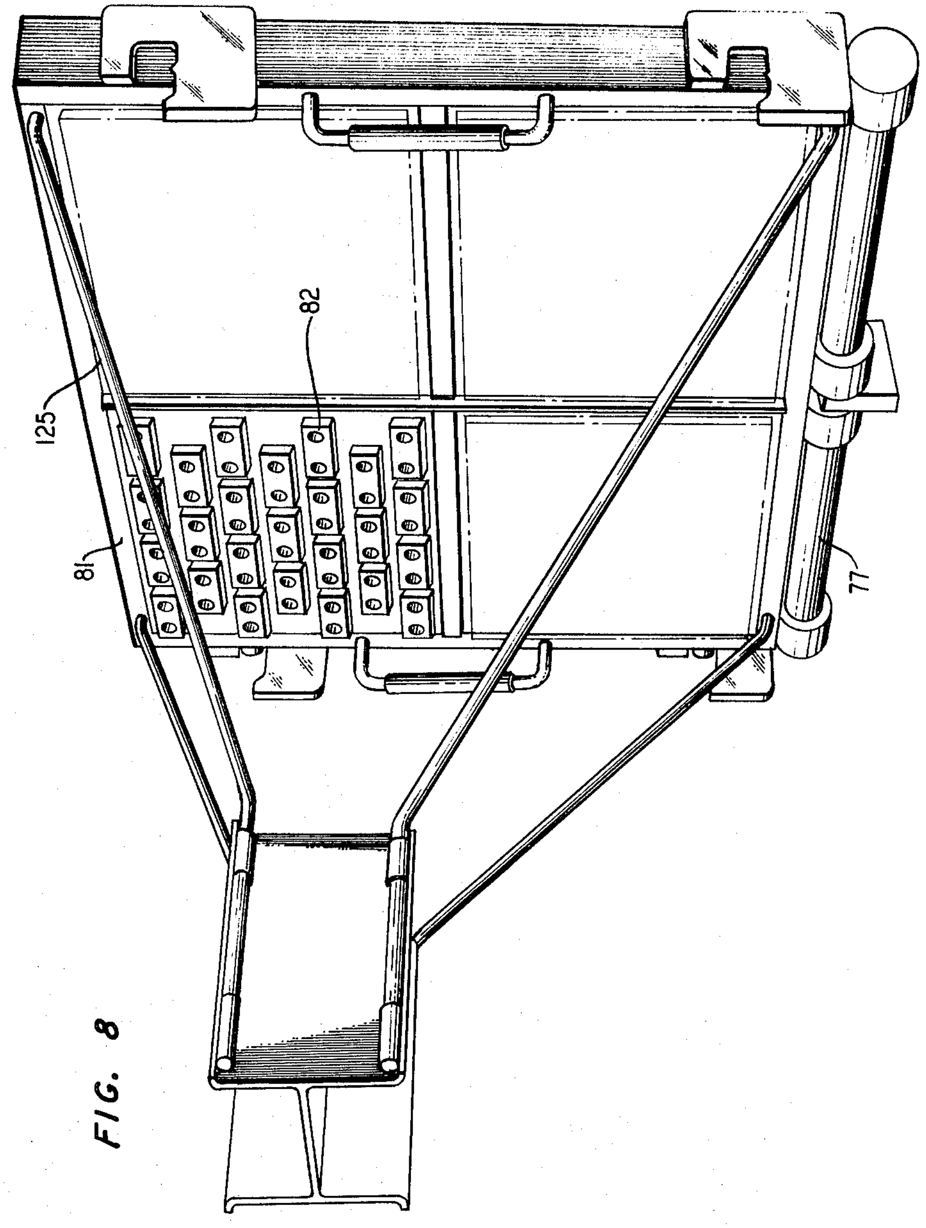
FIG. 8 is a sketch in front perspective view of one of the connector mechanisms with the front bay in place.
Figure 9:
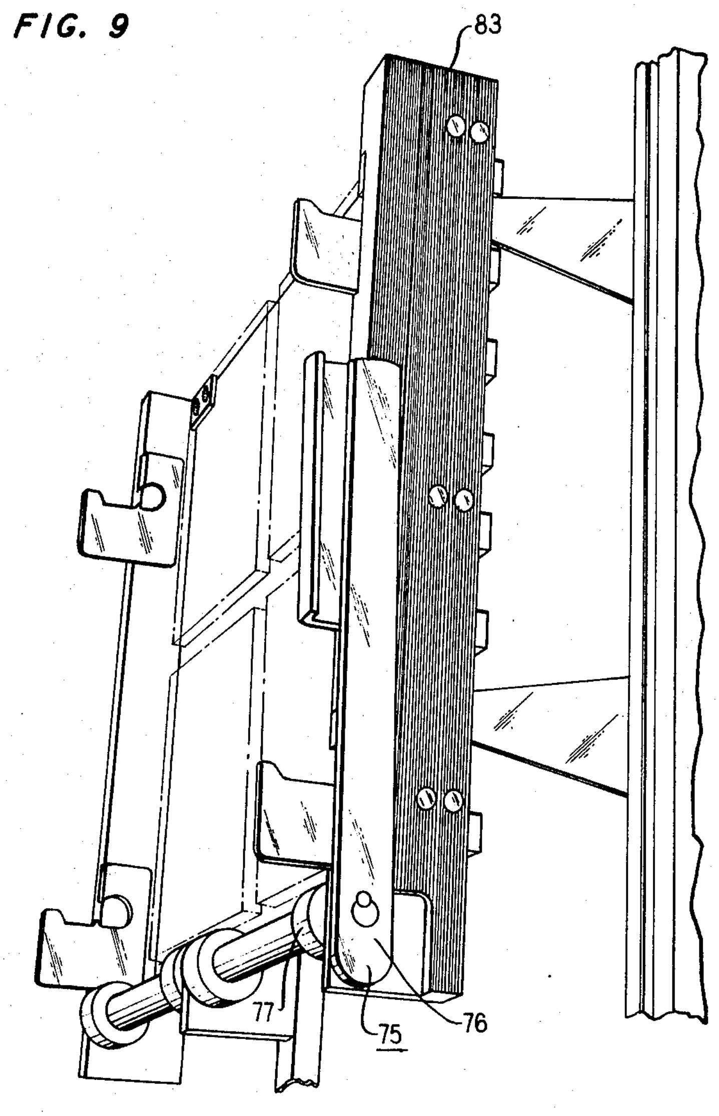
FIG. 9 is a sketch in side perspective view of the rear bay of one of the connector mechanisms.
Figure 10A:
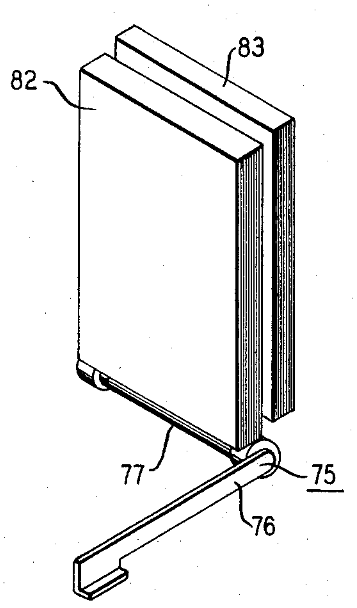
FIG. 10A is a sketch, shown in perspective, of one of the connectors in a partially open position.
Figure 10B:
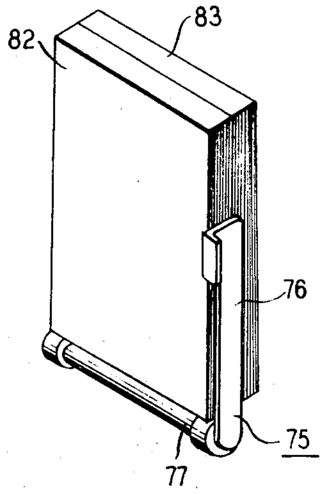
FIG. 10B is a sketch of the connector of FIG. 10A shown in the closed position.

To connect a test cable to the test equipment, a fanning out of the leads is required to provide the transition from the circular area of the cable to the contact module pattern of the front bay 82. A cable holding bracket 125, FIGS. 3, 4 and 8, is provided as a part of the front bay panel, and the cable stub is held rigidly by a clamp 125A supported by the bracket 125. The cable is thus centered with respect to the connector mechanism while the paired leads are fanned out to the geometrical pattern of the contact modules.

The preparation of the cable fanout involves cutting each of the paired leads to a fixed length, coding each of the leads and crimping a taper pin (not shown) to the end of each lead. This operation may be implemented advantageously by the use of a template (not shown) simulating the contact position of the front bay 82 on either of the connector mechanisms 14 or 15.

When the cable stub has been prepared as indicated and is temporarily fixed on the cable holding bracket 125 on the front bay 82, the tapered pin lead (not shown) is inserted into the tapered receptacle (not shown) into its coded position on the front bay. After all pins are installed, the cable clamp 125A is loosened and the cable is pulled back on the holding bracket 125 to make taut the paired leads of the fanout. This work can be done remote from the connector unit since the front bay 82 is completely removable from the connector mechanism.

Computer and Program Functions

As indicated above, an important aspect of the invention involves the use of a general-purpose computer by means of which the operator is able to initiate any one of several types of measurements between any two pairs of wires without the need for manual adjustments. In one illustrative embodiment of the invention, a standard commercial Digital Equipment Corporation PDP-8/S small-scale, general purpose computer was employed. Inputs and outputs of the computer were as shown functionally and schematically in FIG. 2.

The indicated computer employs a 4096 code memory which is accessed at random by a 12-bit word in the memory address register. The central processor performs arithmetic, logic and system control operations, working in the main register or accumulator. The accumulator also passes input/output commands through a buffer and interface circuits to peripheral equipment, activating various system components according to a specific code. In addition to the computer itself, it is advantageous to employ a high speed perforated tape reader for reading in a binary tape of the entire program at the start, and additionally, a teleprinter punch for recording output and receiving operator requests to initiate the operational modes.

While any one of a number of computer languages may be adapted for the use indicated, an assembler language has been found convenient. In using such a language, each command has an equivalent four-digit octal code which is assembled by the computer's assembler routine into a sequence of executable orders. This sequence is then punched out onto a binary format tape during assembly and becomes the form in which the program exists to be read into the computer for execution.

Figure 7:
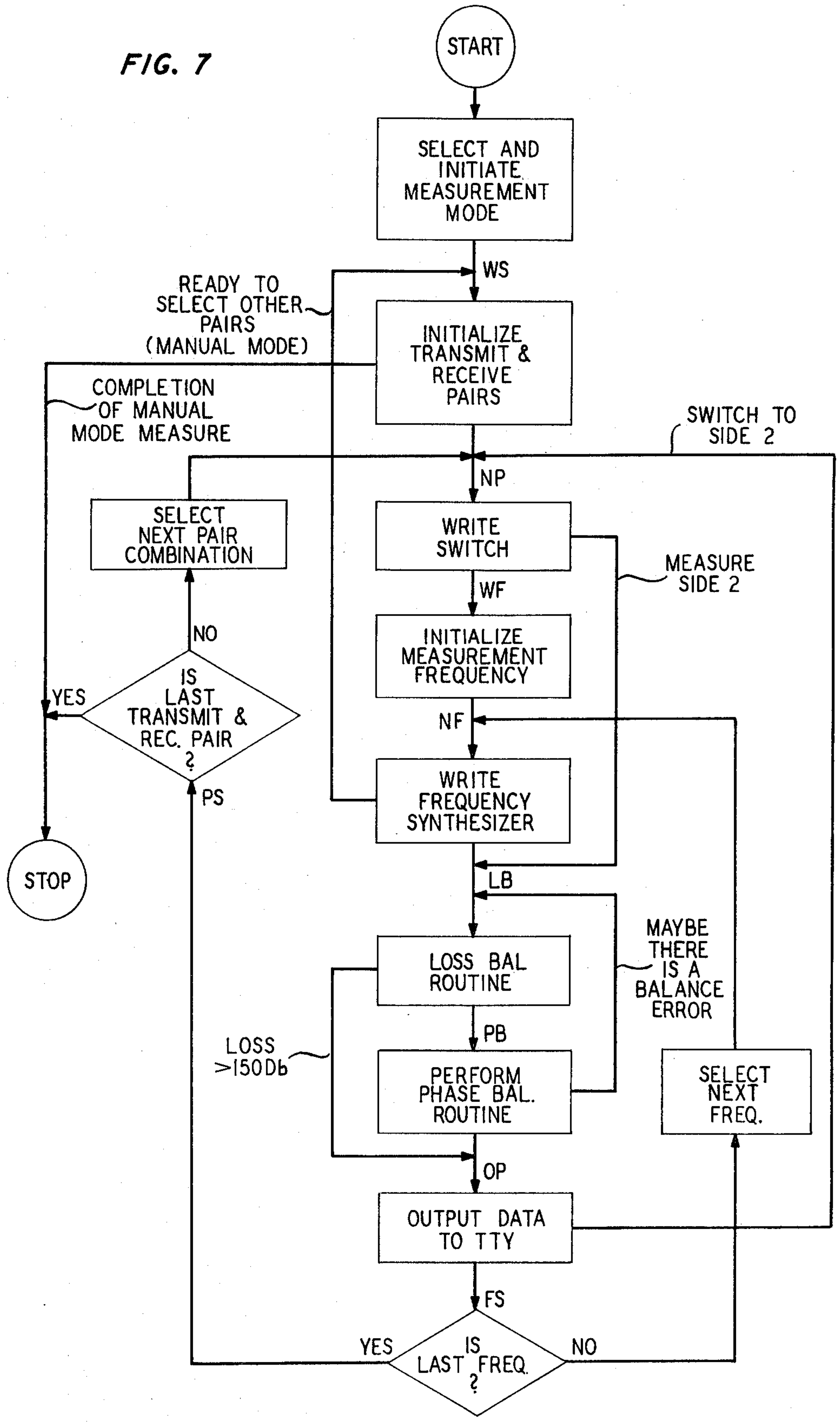
FIG. 7 is a flow chart of an illustrative computer program suitable for programming the computer shown in FIG. 1 and FIG. 2.

A flow chart for an illustrative program is shown in FIG. 7. This program occupies approximately two-thirds of the available 4096 storage locations in the computer. It may be entered into the computer through a high speed perforated reader as indicated above. The first activity of the main program is the storage of operator responses to computer-initiated questions. These questions concern the particular combinations of measurements that the operator wishes to choose. Options include measuring near-end or far-end crosstalk or attenuation and making either a balanced or a longitudinal measurement. In addition, frequencies may be selected manually, machine calculated or read from a previously compiled table of frequencies which are entered into the computer at execution time. The program stores these responses for future reference in determining which of several branches it will follow during the execution of commands. After a question has been typed out, the computer waits for a response, retaining only the first character as significant and searching for a line to feed in order to signal its next question. If the character it receives is not acceptable as a valid response, it then types "ERROR" and recycles, awaiting for a corrected response from the operator.

Having recorded the type of measurement to be performed as well as the specific pairs to be measured, the computer begins its second activity, which is the signaling of the various hardware components to begin measurements. This step involves opening appropriate switching paths and setting the frequency synthesizer. From that point on, the computer operates and monitors the equipment with no further required assistance from the operator. Switches are set according to predetermined input/output codes which have been selected to correspond to the types of measurements previously chosen. Likewise, setting the frequency synthesizer is accomplished by converting a given frequency into the proper form and using a code to communicate it to the synthesizer.

The Loss Balance routine which is a subroutine of the main control program effects the actual arithmetic balancing between the known standard loss, initialized to zero, and the unknown loss on a given pair. The routine is comprised of arithmetic subroutines for manipulation of the data read into it and of input/output subroutines for the reading and adjusting of the standard loss.

If the loss reading exceeds 150 db, the program proceeds directly to the output routine. Here it is indicated on the printout that the loss was too high to be measured and, therefore, phase shift is unknown. If, however, the loss is within the range of the equipment, the next routine entered will be the phase balance routine. To measure phase shift, a time interval meter counts the gated pulses sent out by the clock between the positive zero crossings of the reference and measured sine waves. The reference sine wave is taken from the input signal to the loss detector. The measured sine wave comes from the output signal from the frequency synthesizer. This count is proportional to the actual phase shift. Owing to a possible malfunction in the hardware, the existence of extraneous pulses resulting from noise or an incorrect loss balance caused by noise, a phase shift may be read outside the ±180° range. The program is designed to make nine attempts, at most, to read a phase shift within a ±180° range, two of which include a recycling through the loss balance routine. No averaging of results occurs and the program accepts the first successful result it achieves. Except in the case of hardware malfunction, the apparent redundancy of nine measurements is justified in an effort to achieve optimum results. Only the results (loss and phase) achieved by the final measurement are retained for output.

The output routine is largely concerned with the printing out of results as they are calculated. Previous to this step, a heading is formed from the initial operator decisions of the measurement modes, and results are tabulated below the heading on the teleprinter. During the manipulation of data within the program, numbers exist in a binary form, single or double precision. Output routines require that they be converted into binary coded decimal form with a decimal placed correctly. Since the standard DPD routine only converts integers ranging from zero to 999, improvisational routines may be added to convert double converted numbers and those that exceed 999.

Final program activity involves monitoring the frequency and pair selections to determine whether or not the final measurements have been made. If not, the frequency synthesizer is adjusted to the next frequency or the pair numbers are incremented by one to set the next pair of switches in the matrix. The computer then re-enters its second activity and continues executing in sequence the entire program until the final measurements have been made.

It is to be understood that the embodiment described herein is merely illustrative of the principles of the invention. Various modifications thereto may be effected by persons skilled in the art without departing from the spirit and scope of the invention.

What is claimed is:

1. A multi-pair cable testing system comprising, in combination:

a test signal generator for selectively generating any one of a plurality of preselected test signals;

means for selectively establishing any one of a plurality of transmission paths having a known loss characteristic;

means for detecting loss and phase differences between applied signals up to 150 db at 10 MHz;

switch means for establishing a conducting path between said generator and said detecting means by way of a selected one of said transmission paths and alternately by way of a selected one or more of the conductors of said cable;

computer means for controlling the selective operation of said generator, said known loss establishing means, said detecting means and said switch means in accordance with a programmed sequence;

said known loss establishing means including first means for selectively introducing one of a plurality of bulk loss levels in combination with second means for selectively introducing vernier loss levels;

said conducting path including, in series relation, an RF amplifier stage, a mixing stage, said second means which comprises an intermediate frequency standard loss input stage, and an intermediate frequency amplifier stage;

means including said computer means for adjusting the gain of said last named amplifier to be equal to the loss introduced by said loss establishing means, whereby the input level to said detecting means is made substantially equal to the output of said generator, thus facilitating both phase and loss detection;

and means responsive to outputs from said computer means for registering the results of conducted tests whereby the testing of an entire cable for a plurality of preselected characteristics may be carried out automatically.

2. Apparatus in accordance with claim 1 wherein said switch means comprises a plurality of switch matrices, each of said matrices comprising a group of high-isolation, shielded reed switches.

3. Apparatus in accordance with claim 2 wherein each of said switches comprises first and second pairs of reed switch contacts in series relation and interleaved third and fourth shunt pairs of reed switch contacts providing paths connectable to ground.

4. Apparatus in accordance with claim 1 including a quick connect-disconnect mechanism for connecting both ends of said cable to said testing system, said mechanism including input and output terminal plate portions comprising a plurality of individual terminals to which the cable conductors are attached, said plate portions being adapted for ready connection to or disconnection from said system with a cable to be tested attached thereto, whereby a first cable to be tested may be processed for connection to a first set of said plate portions while a second cable connected to a second set of said plate portions is being tested, thereby increasing the productive testing time of said system.

5. Apparatus in accordance with claim 4 wherein said mechanism includes a lever-operated cam arrangement and fixed plate portions adapted for mating engagement with said terminal plate portions, the closing of said lever rotating said cam thereby to drive said terminal plate portions into said engagement with said fixed plate portions, said engagement effecting the completion of conducting paths between the conductors at each end of the cable to be tested and a corresponding one of said switch matrices.

* * * * *